(12) United States Patent
Kanas et al.

(10) Patent No.: US 10,520,982 B2
(45) Date of Patent: Dec. 31, 2019

(54) MOUNTING DISPLAYS

(71) Applicant: HEWLETT-PACKARD DEVELOPMENT COMPANY, L.P., Houston, TX (US)

(72) Inventors: Derek Kanas, Houston, TX (US); Tony Moon, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/074,462

(22) PCT Filed: Oct. 13, 2016

(86) PCT No.: PCT/US2016/056805
§ 371 (c)(1),
(2) Date: Aug. 1, 2018

(87) PCT Pub. No.: WO2018/071023
PCT Pub. Date: Apr. 19, 2018

(65) Prior Publication Data
US 2019/0064880 A1 Feb. 28, 2019

(51) Int. Cl.
*G06F 1/16* (2006.01)
(52) U.S. Cl.
CPC .................. *G06F 1/1637* (2013.01)
(58) Field of Classification Search
CPC .................................................... G06F 1/1637
See application file for complete search history.

(56) References Cited

U.S. PATENT DOCUMENTS

| | | | |
|---|---|---|---|
| 5,739,880 A | 4/1998 | Suzuki et al. | |
| 6,233,140 B1* | 5/2001 | Cummings | G06F 1/1601 |
| | | | 248/917 |
| 6,671,012 B1 | 12/2003 | Tanaka | |
| 6,809,690 B2 | 10/2004 | Tao | |
| 6,853,336 B2 | 2/2005 | Asano et al. | |
| 7,072,690 B2 | 7/2006 | Shin et al. | |
| 7,310,222 B2 | 12/2007 | Bovio et al. | |
| 8,526,170 B2* | 9/2013 | Nishikawa | G06F 1/1698 |
| | | | 361/679.01 |
| 8,576,202 B2* | 11/2013 | Tanaka | G06F 3/0416 |
| | | | 345/177 |
| 8,654,517 B2 | 2/2014 | Aumiller et al. | |
| 2002/0151328 A1* | 10/2002 | Shin | G06F 1/1616 |
| | | | 455/557 |
| 2009/0257207 A1* | 10/2009 | Wang | G06F 1/1626 |
| | | | 361/752 |
| 2012/0099026 A1 | 4/2012 | Yokota | |
| 2012/0106036 A1 | 5/2012 | Kao | |

(Continued)

FOREIGN PATENT DOCUMENTS

| | | |
|---|---|---|
| SU | 516336 A3 | 5/1976 |
| TW | M269466 U | 7/2005 |
| TW | 201428387 A | 7/2014 |

(Continued)

*Primary Examiner* — Kevin Quarterman
(74) *Attorney, Agent, or Firm* — Trop, Pruner & Hu, P.C

(57) ABSTRACT

In some examples, a display mounting apparatus includes a bracket comprising a tab, the tab including an attachment member to affix the bracket to an outer display cover of a display device. An adhesive layer is to attach a display panel of the display device to the bracket.

19 Claims, 7 Drawing Sheets

(56) References Cited

U.S. PATENT DOCUMENTS

2012/0170179 A1\* 7/2012 Aumiller ............... G06F 1/1626
                                                   361/679.01
2014/0292588 A1   10/2014 Yoon et al.

FOREIGN PATENT DOCUMENTS

| TW | 201510697 A  | 3/2015 |
| WO | 2011119368 A1 | 9/2011 |

\* cited by examiner

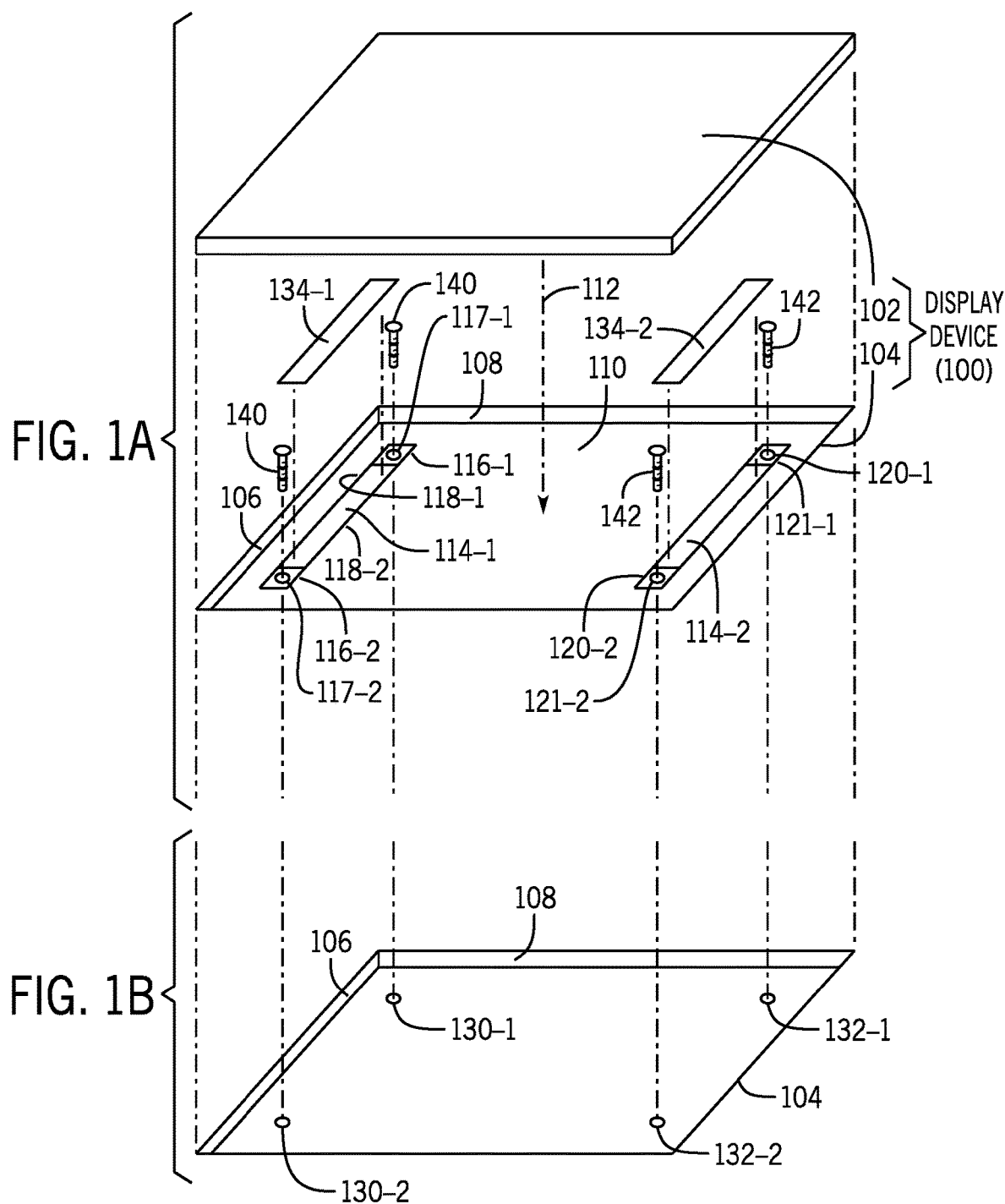

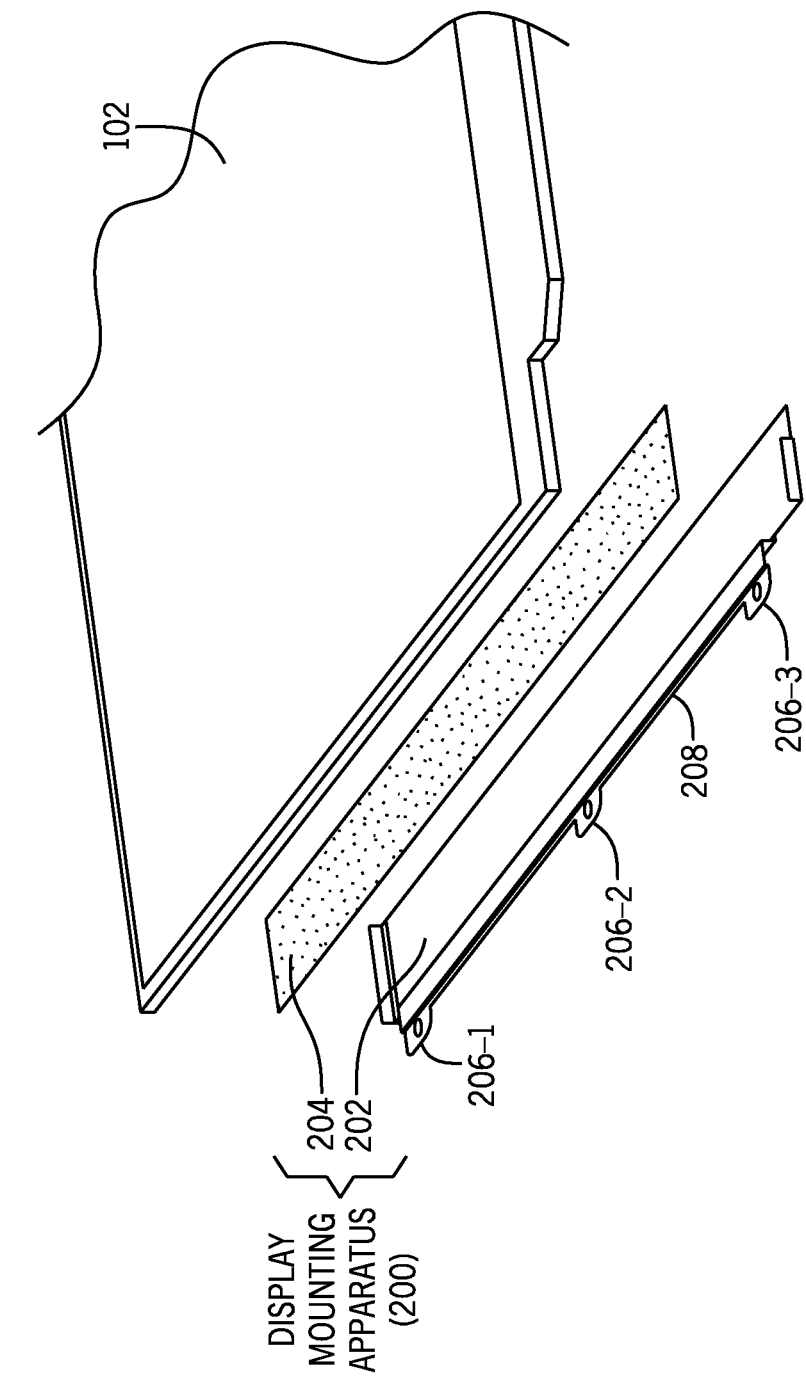

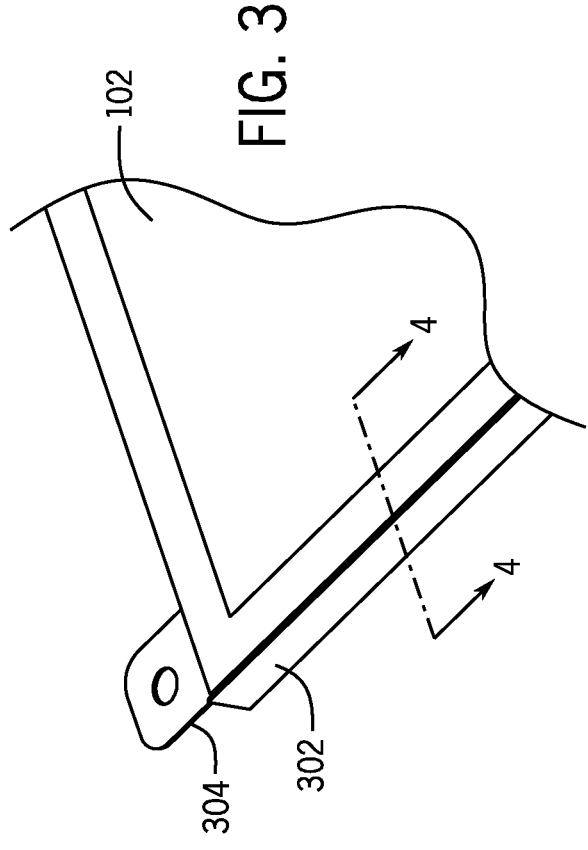
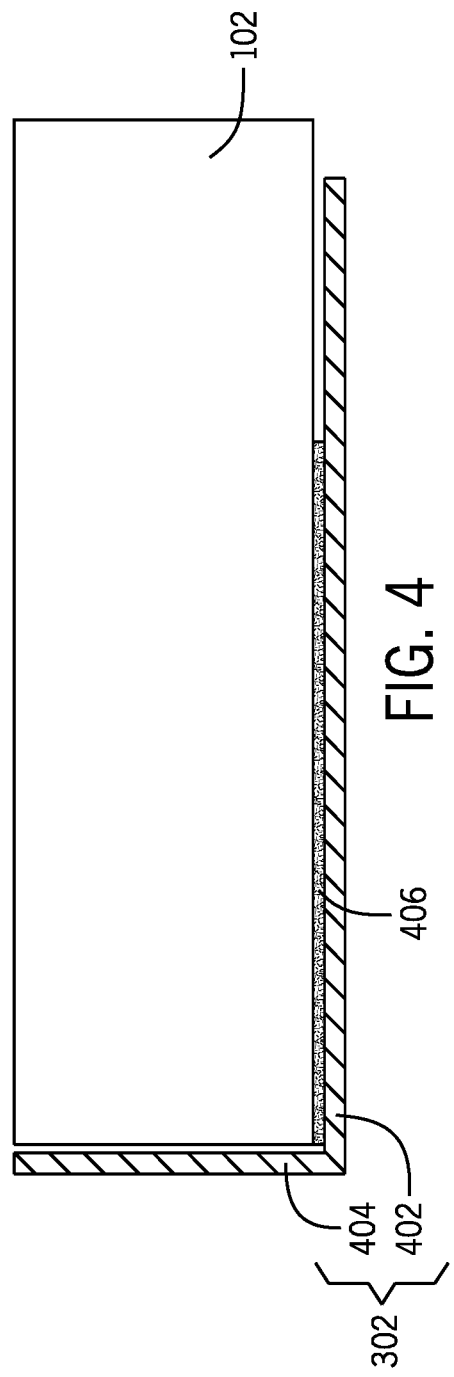

MOUNTING DISPLAYS

BACKGROUND

Display devices can be used to display images or other information to users. A display device can include a display panel that is mounted within an outer display cover. In some examples, a display device can be part of a notebook computer that has a clamshell type configuration, where the notebook computer has a base and a display device pivotally attached to the base. In other examples, the display device can be part of a tablet computer.

BRIEF DESCRIPTION OF THE DRAWINGS

Some implementations of the present disclosure are described with respect to the following figures.

FIG. 1A is an exploded perspective view of a display device including a display panel, an outer display cover, and a mounting apparatus according to some examples.

FIG. 1B is a perspective view of the outer display cover of FIG. 1A, according to some examples.

FIG. 2 is a perspective view of an arrangement including a display mounting apparatus and a display panel, according to some examples.

FIG. 3 is a perspective view of a portion of an assembly including a display panel and a bracket according to some examples.

FIG. 4 is a cross-sectional view of the assembly of FIG. 3, according to some examples.

DETAILED DESCRIPTION

Figure 5A:
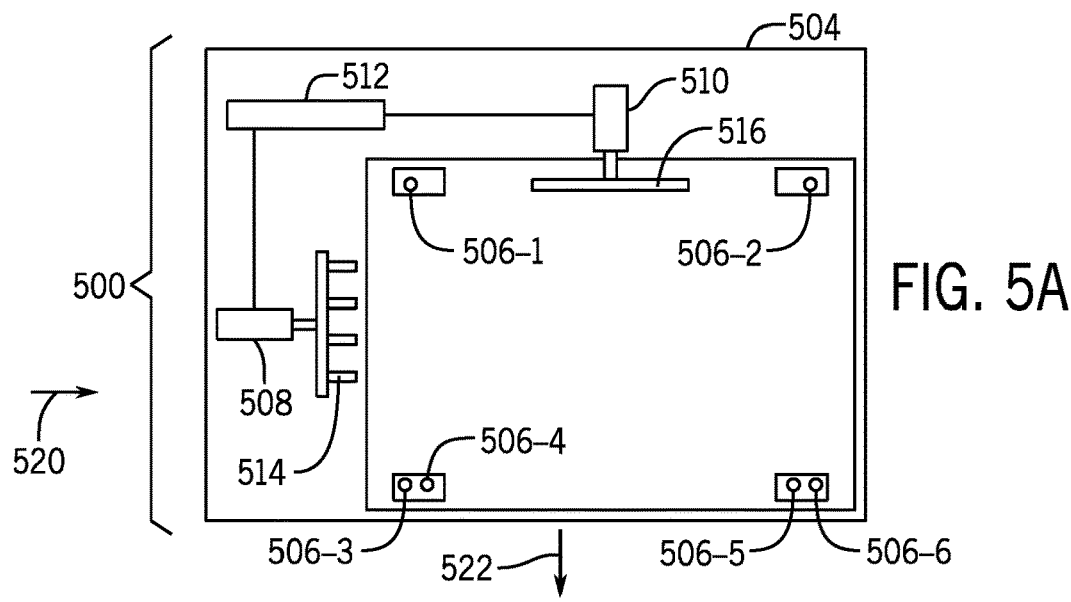
FIGS. 5A-5F illustrate an assembly process for a display device, according to some examples.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Various techniques can be used to mount a display panel in an outer display cover of a display device. The outer display cover provides structural support for the display panel, and also protects the display panel from damage due to impact from external objects.

In some examples, mounting of display panels in outer display covers can be according to standards provided by the Video Electronics Standards Association (VESA). VESA mounting techniques can employ mounting tabs integrally formed with a display panel. A mounting tab is integrally formed with a display panel if the mounting tab is formed with a frame of the display panel as one piece during manufacture of the display panel.

Mounting tabs integrally formed with a display panel can take up a peripheral space that surrounds the display panel, where the peripheral space is defined between the outer edges of the display panel and the edges of the outer display cover. In some cases, the peripheral space can be used to accommodate components such as antennas to perform wireless communications. The presence of the display panel mounting tabs can be space inefficient and can reduce the amount of space that is available for mounting antennas.

In other examples, mounting techniques can glue display panels directly to outer display covers. However, gluing a display panel to an outer display cover can reduce flexibility for later maintenance and repair, since the glued display panel cannot be removed from the outer display cover. Additionally, in further examples, a display panel (such as a touchscreen display panel) can be directly bonded to cover glass to mount the display panel, which may be undesirable.

In accordance with some implementations of the present disclosure, a mounting bracket (or more simply "bracket") that is separate from a display panel can be used to mount the display panel in an outer display cover. The bracket includes a tab that has an attachment member. The display panel is attached to the bracket using an adhesive layer, and a fastener affixes the attachment member of the tab of the bracket to the outer display cover. By using the separate bracket to mount the display panel in the outer display cover, the tab of the bracket can be placed closer to the edge of the outer display cover than in implementations where a mounting tab is integrally formed with the display panel. Placing the tab of the bracket closer to the edge of the display cover provides more peripheral space between an outer edge of the display panel and an edge of the outer display cover. The increased peripheral space can accommodate a larger number of components and/or larger sized components, as compared to a peripheral space that is available in implementations where the mounting tab of the display panel occupies part of the peripheral space. Components that can be mounted in a peripheral space between a display panel and an outer display cover can include antennas to perform wireless communications. Additionally, by using the mounting bracket according to some implementations, a display panel would not have to be glued or directly bonded to an outer display cover or a cover glass.

FIG. 1A depicts an exploded perspective view of a display device 100 that includes a display panel 102 and an outer display cover 104 that receives the display panel 102. FIG. 1B depicts the outer display cover 104 of the display device 100.

In some examples, the outer display cover 104 has raised side walls (two side walls 106 and 108 shown in FIG. 1) provided on the four sides of the outer display cover 104. The side walls (including the side walls 106 and 108) define a chamber 110 to receive the display panel 102, as indicated by arrow 112.

FIG. 1A also shows mounting brackets 114-1 and 114-2 provided at respective lateral side portions in the chamber 110 of the outer display cover 104. In other examples, the brackets 114-1 and 114-2 can be provided at the top and bottom side portions of the display panel 104.

Although a specific number of brackets 114-1 and 114-2 is shown in FIG. 1A, it is noted that in other examples, a different number of brackets can be used to mount the display panel 102 inside the outer display cover 104. The different number of brackets can include just one bracket, or more than two brackets.

The bracket 114-1 has a first tab 116-1 at a first end of the bracket 114-1, and a second tab 116-2 at a second end of the bracket 114-1, where the second end is opposite of the first end on the bracket 114-1. The ends of the bracket 114-1 at which the tabs 116-1 and 116-2 are arranged are distinguished from the lateral sides 118-1 and 118-2 of the bracket 114-1. The lateral side 118-1 is the left lateral side, whereas the lateral side 118-2 is the right lateral side, in the view shown in FIG. 1.

The bracket 114-2 similarly includes tabs 120-1 and 120-2 provided on opposite ends of the bracket 114-2. As used here, the term "tab" can refer to any protruding member that is attached to a bracket. The protruding member can be integrally part of the bracket, or the protruding member can be a separate piece that is affixed to the bracket.

In some examples, each of the tabs 116-1, 116-2, 120-1, and 120-2 has a respective mounting opening 117-1, 117-2, 121-1, and 121-2. Although just one opening is shown in each tab in FIG. 1A, it is noted that in other examples, each tab can have multiple openings. Each opening of a tab is a through-hole that extends through the tab.

A fastener can be passed through each of the openings of the tabs to attach the tab to a corresponding receptacle (130-1, 130-2, 132-1, or 132-2 shown in FIG. 1B) formed in the inner surface of the outer display cover 104. The inner surface of the outer display cover is the surface that faces the display panel 102 when the display panel 102 is received in the chamber 110 of the outer display cover 104.

As shown in FIG. 1A, fasteners 140 and 142 can be used to extend through the openings 117-2 and 121-2, respectively, of the tabs 116-2 and 120-2. Similar fasteners (not shown) can be used to extend through the openings 117-1 and 121-1, respectively, of the tabs 116-1 and 120-1. The fasteners 140 and 142 can be screws in some examples. In other examples, the fasteners 140 and 142 can be posts or other structures extending from the outer display cover 104.

If the fasteners are screws, then the receptacles 130-1, 130-2, 132-1, and 132-2 of the outer display cover 104 can be screw holes to receive the screws. As shown in FIGS. 1A and 1B, the opening 117-1 of the tab 116-1 is aligned with the receptacle 130-1, the opening 117-2 of the tab 116-2 is aligned with the receptacle 130-2, the opening 121-1 of the tab 120-1 is aligned with the receptacle 132-1, and the opening 121-2 of the tab 120-2 is aligned with the receptacle 132-2.

In other examples, the fasteners used to attach the tabs 116-1, 116-2, 120-1, and 120-2 to the outer display cover 104 can include posts extending from the inner surface of the outer display cover 104, where the mounting openings 117-1, 117-2, 121-1, and 121-2 of the tabs can be provided onto the posts to arrange the brackets 114-1 and 114-2 onto the outer display cover 104. The fasteners in such examples can further include nuts or other types of attachment elements to connect to the posts once the posts have passed through the openings of the tabs, to affix the brackets 114-1 and 114-2 to the outer display cover 104.

In further examples, instead of providing mounting holes in the tabs 116-1, 116-2, 120-1, and 120-2, posts can be provided on the tabs instead, with the posts for receipt in receptacles of the outer display cover 104.

More generally, the tabs 116-1, 116-2, 120-1, and 120-2 of the brackets 114-1 and 114-2 have attachment members that are to attach to corresponding attachment members of the display cover 104.

Once the tabs 116-1, 116-2, 120-1, and 120-2 of the brackets 114-1 and 114-2 are attached to the inner surface of the outer display cover 104, the display panel 102 can be affixed to the brackets 114-1 and 114-2 using respective adhesive layers 134-1 and 134-2. The adhesive layer 134-1 or 134-2 adheres to the upper surface of the respective bracket 114-1 or 114-2, and to a portion of the lower surface of the display panel 102. When attached together, the adhesive layer 134-1 or 134-2 is sandwiched between the display panel 102 and the respective bracket 114-1 or 114-2.

The adhesive layer 134-1 or 134-2 can be formed of any substance that is able to stick objects together. For example, the adhesive layer 204 can include glue, cement, a paste, a film with an adhesive on an upper surface of the film and an adhesive on a bottom surface of the film, and so forth.

By using the adhesive layer 134-1 or 134-2 to bond the display panel 102 to the brackets 114-1 and 114-2, mounting tabs or other attachment members do not have to be provided on the display panel 102. Thus, use of an adhesive layer allows mounting of a display panel to an outer display cover without use of an attachment member on the display panel to attach the display panel to the outer display cover.

FIG. 2 is an exploded perspective view of a portion of an assembly that includes a display mounting apparatus 200 and the display panel 102. The display mounting apparatus 200 includes a bracket 202 and an adhesive layer 204 that attaches a portion of a lower surface of the display panel 102 to an upper surface of the bracket 202. The adhesive layer 204 is similar to the adhesive layer 134-1 of FIG. 1A.

The bracket 202 of FIG. 2 has mounting tabs 206-1, 206-2, and 206-3 that extend from an outer lateral side 208 of the bracket 202. The outer lateral side 208 is the outer lateral side is the side that is closest to the adjacent edge of an outer display cover, such as the outer display cover 104 of FIG. 1. The bracket 202 thus differs from the bracket 114-1 or 114-2 of FIG. 1 in that the tabs of FIG. 2 are provided on the outer lateral side of the bracket 202, whereas the tabs 116-1 and 116-2, or the tabs 120-1 and 120-2, are provided on the ends of the bracket 114-1 or 114-2.

Although three tabs 206-1, 206-2, and 206-3 are shown in FIG. 2, it is noted that in different examples, the bracket 202 can have a different number of tabs. The tabs 206-1, 206-2, and 206-3 can each include an attachment member, such as an opening or other type of attachment member, to allow the bracket 202 to be affixed by a fastener to the outer display cover.

FIG. 3 is a perspective view of another assembly according to further examples, which includes a bracket 302 and the display panel 102 that is attached to the bracket 302. As shown in FIG. 3, a tab 304 is attached to an end of the bracket 302, similar to the arrangement of tabs shown in FIG. 1 on the brackets 114-1 and 114-2.

A sectional view along section 4-4 is shown in FIG. 4. In the sectional view, the bracket 302 has a bottom wall 402 and a sidewall 404, where the sidewall 404 is angled from the bottom wall 402. In examples according to FIG. 4, the sidewall 404 is at a right angle to the bottom wall 402. In other examples, the sidewall 404 can be at a different non-zero angle with respect to the bottom wall 402. The display panel 102 is received in the space defined by the walls 402 and 404 of the bracket 202. An adhesive layer 406 adheres the display panel 102 to the bottom wall 402 of the bracket 302.

FIGS. 5A-5F show an example assembly process to assemble a display device 510 (FIG. 5F) using an assembly equipment 500 (FIG. 5A). The assembly equipment 500 of FIG. 5A includes an assembly fixture 504 that has alignment posts 506-1, 506-2, 506-3, 506-4, 506-5, and 506-6 arranged on a surface of the fixture 504. An "assembly fixture" or more simply a "fixture" can refer to any platform on which assembly of a display device can be performed. Although a specific number of alignment posts are shown in FIG. 5A, it is noted that in other examples, a different number of alignment posts can be employed. In FIG. 5A, two pairs of alignment posts are provided on the bottom part of the fixture 504, where a first pair includes alignment posts 506-3 and 506-4 that are positioned close to one another, and a second pair includes alignment posts 506-5 and 506-6 that are positioned close to one another.

In addition, the assembly equipment 500 includes drivers 508 and 510. The driver 508 includes an engagement member 514, and the driver 510 includes an engagement member 516. Each of the drivers 508 and 510 can be actuated to move the respective engagement members 514 and 516 along respective directions 520 and 522. The drivers 508 and 510 are operatively coupled to an actuator 512, which in some examples can be a pneumatic actuator that can pneumatically control the drivers 508 and 510 to move the respective engagement members 514 and 516. In other examples, the actuator 512 can include a motor or any other component that is able to impart energy to cause movement of another structure.

Figure 5B:
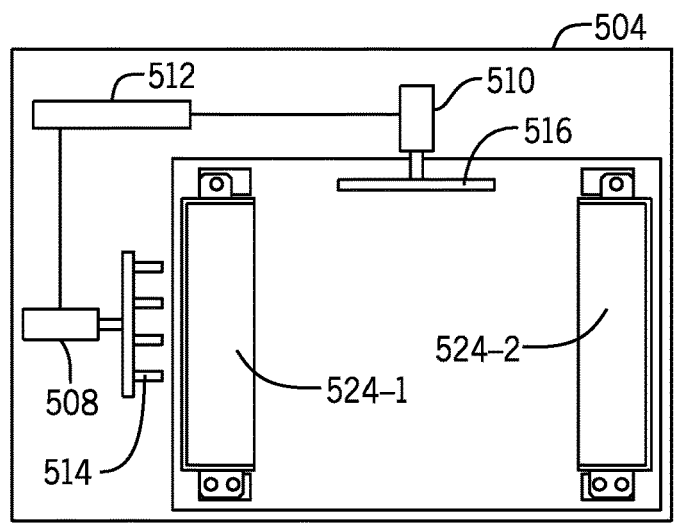

As shown in FIG. 5B, brackets 524-1 and 524-2 are mounted onto the fixture 504. Similar to the brackets 114-1 and 114-2 of FIG. 1A, each bracket 524-1 or 524-2 has tabs on respective opposite ends of the bracket. The brackets 524-1 and 524-2 differ from the design of the brackets 114-1 and 114-2 of FIG. 1A in that the tab provided at the lower end of each bracket 524-1 or 524-2 has a pair of openings (instead of a single opening as shown in FIG. 1A). The tab provided at the upper end of each bracket 524-1 or 524-2 has one opening. The posts 506-1 and 506-2 of the fixture 504 extend through the openings in the tabs provided at the upper ends of the brackets 524-1 and 524-2 when the brackets 524-1 and 524-2 are mounted onto the fixture 504. Similarly, the pairs of posts 506-3, 506-4 and 506-5, 506-6 extend through the respective pairs of openings in the tabs provided at the lower ends of the brackets 524-1 and 524-2 when the brackets 524-1 and 524-2 are mounted onto the fixture 504. The posts 506-1, 506-2, 506-3, 506-4, 506-5, and 506-6 serve to align the brackets 524-1 and 524-2 in the fixture 504.

Figure 5C:
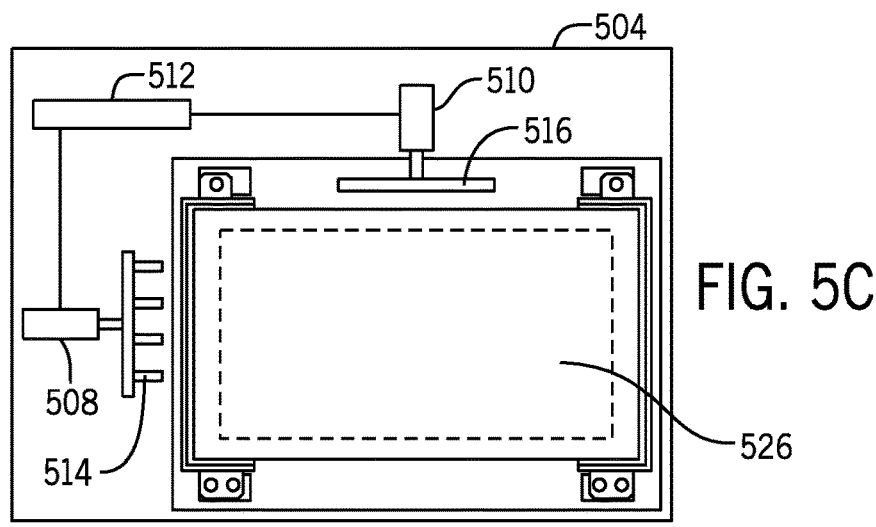

Next, as shown in FIG. 5C, a display panel 526 is attached to the brackets 524-1 and 524-2, by use of adhesive layers (similar to the adhesive layers 134-1 and 134-2 of FIG. 1A).

Figure 5D:
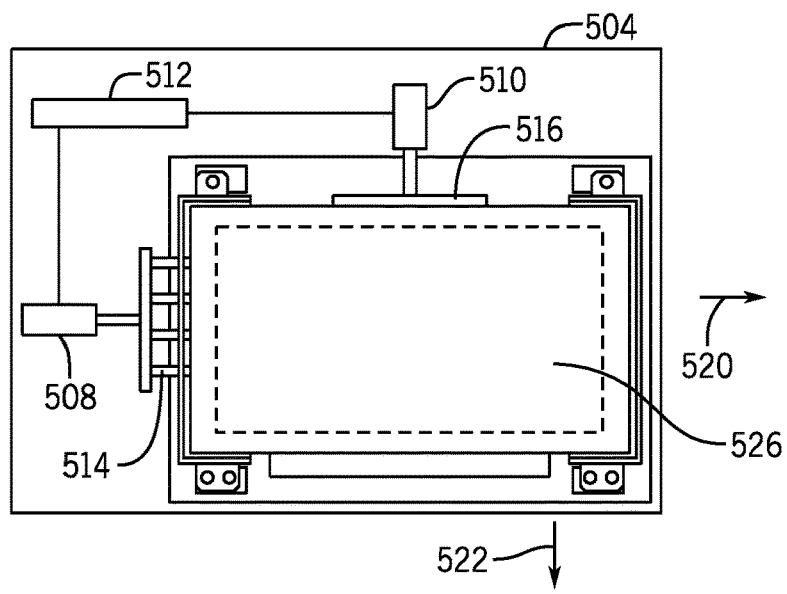

Once the display panel 526 is affixed to the brackets 524-1 and 524-2, the drivers 508 and 510 are activated to cause the respective engagement members 514 and 516 to engage the display panel 526, as shown in FIG. 5D. The engagement member 514 of the driver 508 pushes against a lateral side of the display panel 526, whereas the engagement member 516 of the driver 510 pushes against a top side of the display panel 526. The engagement member 514 pushes the display panel 526 against a fixed side of the fixture 504 along the direction 520, while the engagement member 516 pushes the display panel 526 against another fixed side of the fixture 504 along the direction 522. The pushing by the engagement members 514 and 516 serve to align the display panel 526 with respect to the brackets 524-1 and 524-2, by adjusting a position of the display panel 526 relative to the brackets 524-1 and 524-2.

Figure 5E:
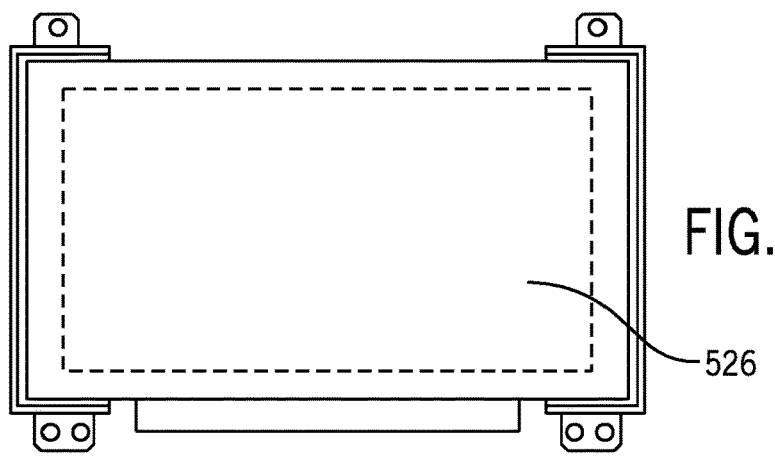
Figure 5F:
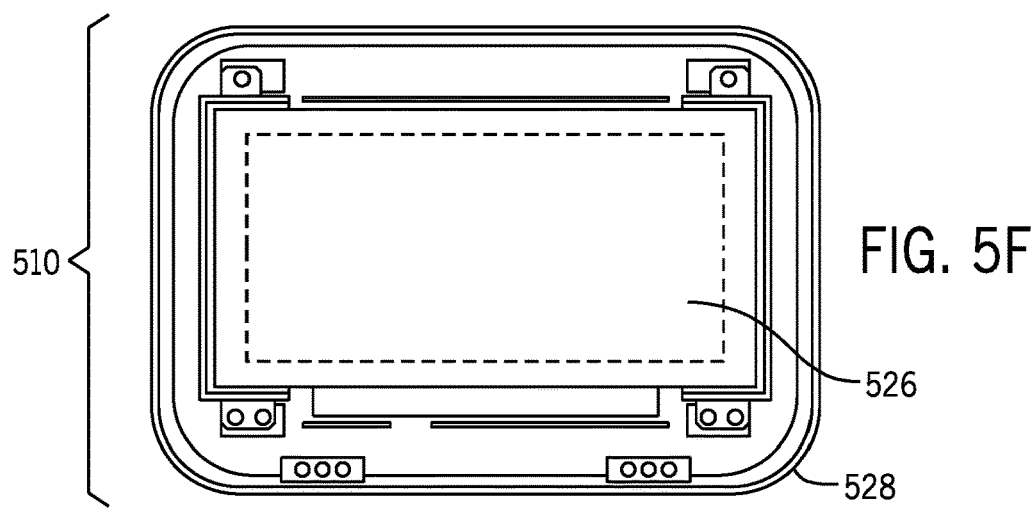

As shown in FIG. 5E, after the display panel 526 has been aligned with respect to the brackets 524-1 and 524-2, the assembly that includes the display panel 526 and the brackets 524-1 and 524-2 is removed from the fixture 504. In FIG. 5F, the assembly of the display panel 527 and the mounting brackets 524-1 and 524-2 are placed into an outer display cover 528. Fasteners are then used to attach the brackets 524-1 and 524-2 to the outer display cover 528, similar to the fastening technique discussed further above.

Figure 6:
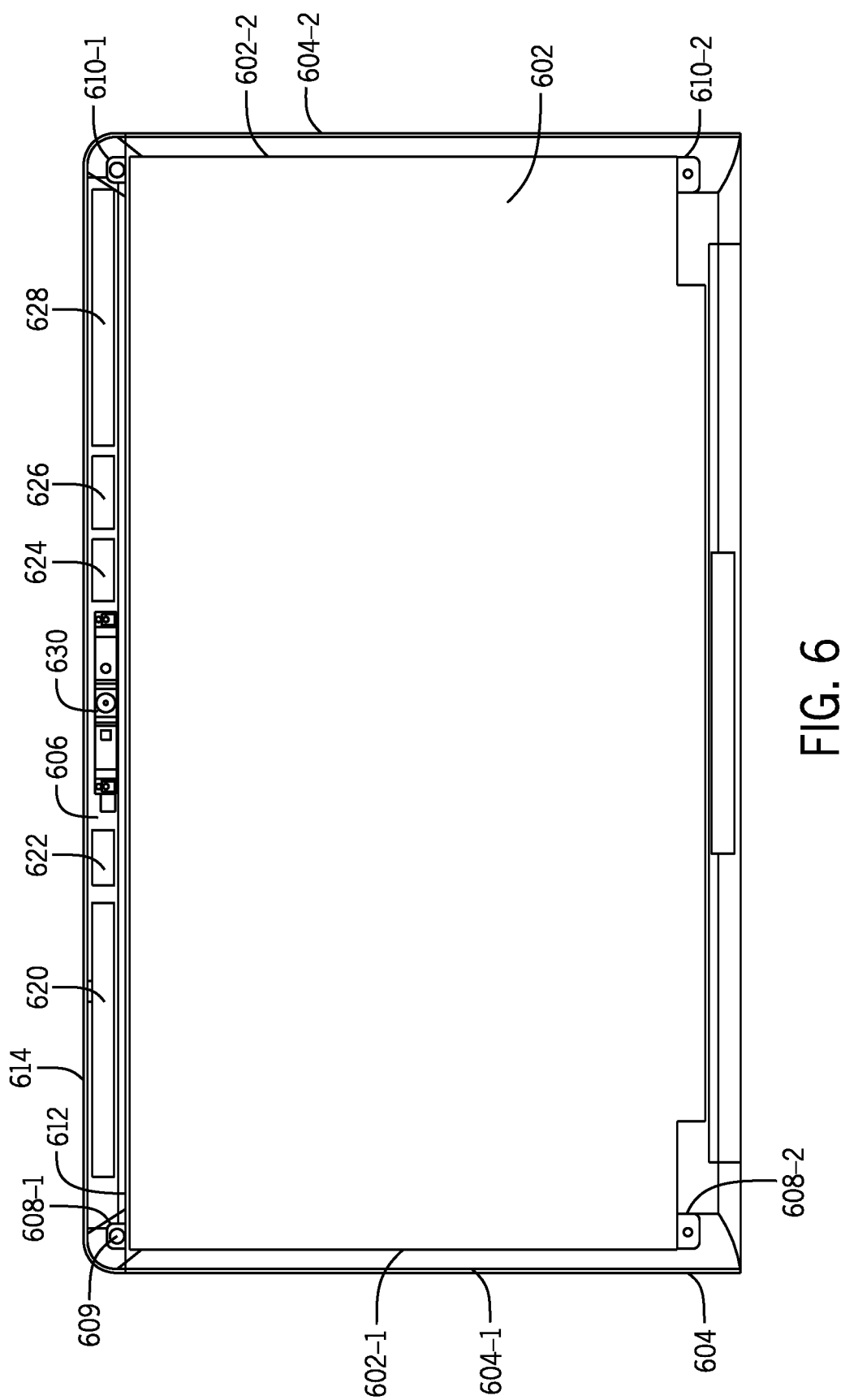
FIG. 6 illustrates a display device including a display panel, an outer display cover, a peripheral space between the display panel and the outer display cover, and components arranged in the peripheral space, according to further examples.

FIG. 6 shows an assembly of a display device that includes a display panel 602 and an outer display cover 604.

The display panel 602 is mounted to the outer display cover 604 using brackets and adhesive layers similar to those discussed above. In FIG. 6, a first bracket includes tabs 608-1 and 608-2 provided at respective ends of the first bracket, and a second bracket includes tabs 610-1 and 610-2 provided at respective ends of the second bracket. The tabs 608-1, 608-2, 610-1, and 610-2 have similar designs as tabs discussed above. In FIG. 6, a fastener 609, such as a screw, is shown extending through a through-hole of the tab 608-1. Similar fasteners can extend through through-holes of the other tabs 608-2, 610-1, and 610-2.

A peripheral space 606 is defined between an outer edge 612 of the display panel 602 and an edge 614 of the outer display cover 604 once the display panel 602 is mounted into the outer display cover 604. As shown in FIG. 6, the tabs 608-1, 608-2, 610-1, and 610-2 of the brackets are located adjacent the lateral side edges 602-1 and 602-2 of the display panel 602. More specifically, the tabs 608-1 and 608-2 are adjacent the lateral side edge 602-1 of the display panel 602, while the tabs 610-1 and 610-2 are positioned adjacent the lateral side edge 602-2 of the display panel 602.

By using brackets according to some examples of the present disclosure, the tabs 608-1, 608-2, 610-1, and 610-2 can be placed closer to respective lateral side edges 604-1 and 604-2 of the outer display cover 604 than is possible in arrangements where a display panel is provided with integral mounting tabs. As a result, the peripheral space 606 available to accommodate components, such as antennas, is increased. More generally, absence of an attachment member on a display panel provides for an increased peripheral space between the display panel and the outer display cover to accommodate antennas or other components.

As shown in FIG. 6, five antennas 620, 622, 624, 626, and 628 are deployed in the peripheral space 606. Although a specific number of antennas are shown, it is noted that in other examples, a different number of antennas can be included in the peripheral space 606. As further shown in FIG. 6, another component, such as a camera assembly 630, can be provided in the peripheral space 606.

In further examples, additional components can be located elsewhere in the display device, such as peripheral spaces between other outer edges of the display panel 602 and respective lateral side edges of the outer display cover 604.

Figure 7:
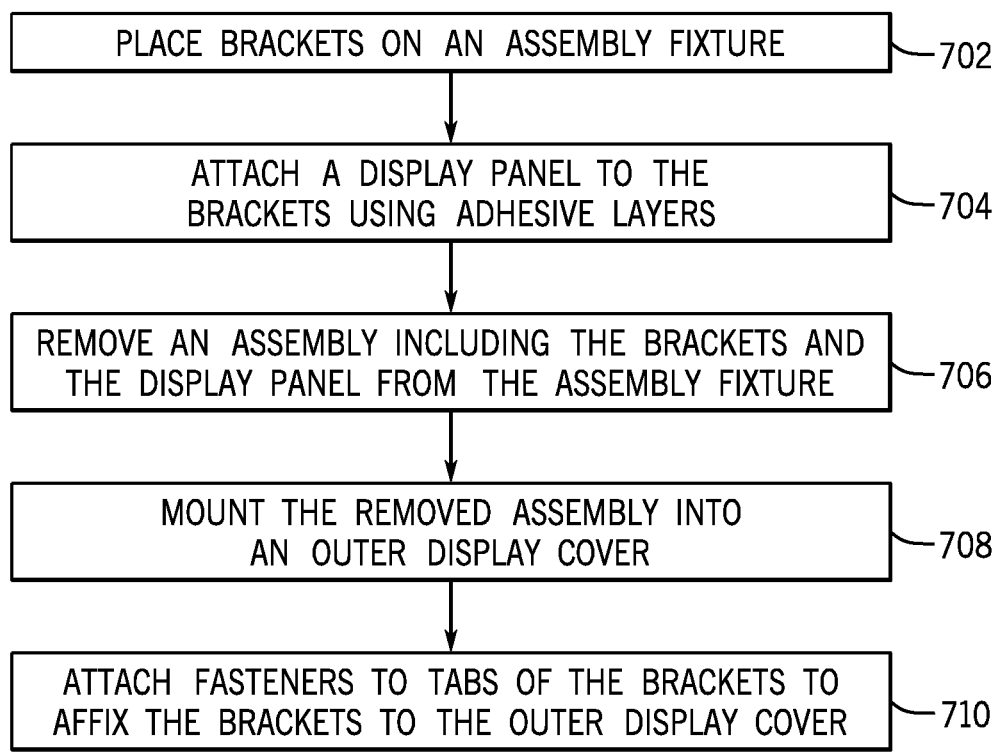
FIG. 7 is a flow diagram of a process according to some examples.

FIG. 7 is a flow diagram of a process of forming a display device according to some examples. The process includes placing (at 702) brackets on an assembly fixture. The process further includes attaching (at 704) a display panel to the brackets using adhesive layers. The process further includes removing (at 706) an assembly including the brackets and the display panel from the assembly fixture, and mounting (at 708) the removed assembly into an outer display cover. The process further includes attaching (at 710) fasteners to tabs of the brackets to affix the brackets to the outer display cover.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:
1. An apparatus comprising:
  an outer display cover comprising a surface to receive a display panel a bracket comprising a tab, the tab comprising an attachment member to affix the bracket to the outer display cover; and an adhesive layer to attach the display panel to the bracket, wherein a peripheral space is defined between an edge of the outer display cover and an edge of the display panel when received on the surface of the outer display cover, the peripheral space to accommodate an antenna.

2. The apparatus of claim 1, wherein the tab comprises a through-hole, and the apparatus further comprises a fastener passed through the through-hole and affixing the bracket to the outer display cover.

3. The apparatus of claim 1, wherein the tab is arranged at an end of the bracket or at a lateral side of the bracket.

4. The apparatus of claim 1, wherein the bracket comprises a bottom wall and a sidewall angled with respect to the bottom wall, the adhesive layer to attach the bottom wall of the bracket to the display panel, and the sidewall and the bottom wall defining a space to receive the display panel.

5. The apparatus of claim 1, wherein the adhesive layer allows mounting of the display panel to the outer display cover without use of an attachment member on the display panel to attach the display panel to the outer display cover.

6. The apparatus of claim 1, further comprising:
a second bracket comprising a tab, the tab of the second bracket comprising an attachment member to affix the second bracket to the outer display cover; and
a second adhesive layer to attach the display panel to the second bracket.

7. A display device comprising:
an outer cover;
a bracket comprising a tab having an attachment member;
a fastener to attach the attachment member to the outer cover;
a display panel received in the outer cover;
an adhesive layer to mount the display panel to the bracket;
a peripheral space between an outer edge of the display panel and an edge of the outer cover; and
antennas arranged in the peripheral space.

8. The apparatus of claim 1, wherein the outer display cover further comprises sidewalls rising from the surface, the sidewalls angled with respect to the surface, and the surface and the sidewalls defining a chamber to receive the display panel, and the apparatus further comprises:
a fastener attaching the attachment member of the tab to an attachment member of the outer display cover.

9. The apparatus of claim 1, further comprising the antenna provided in the peripheral space.

10. The display device of claim 7, wherein the attachment member comprises a through-hole, and the fastener is passed through the through-hole to attach the display panel to the outer cover.

11. The display device of claim 7, wherein the tab is arranged at an end of the bracket and is adjacent the outer edge of the display panel to increase an amount of the peripheral space for accommodating the antennas.

12. The display device of claim 7, wherein the tab is arranged at a lateral side of the bracket.

13. The display device of claim 7, further comprising a camera in the peripheral space.

14. The display device of claim 7, wherein the outer cover comprises a receptacle, the fastener attaching the attachment member of the tab to the receptacle of the outer cover.

15. The display device of claim 7, wherein the bracket comprises a bottom wall and a sidewall angled with respect to the bottom wall, the adhesive layer attaching the bottom wall of the bracket to the display panel, and the sidewall and the bottom wall defining a space that receives the display panel at the bracket.

16. A method of forming a display device, comprising:
placing brackets on an assembly fixture;
attaching a display panel to the brackets using adhesive layers;
removing an assembly including the brackets and the display panel from the assembly fixture;
mounting the removed assembly into an outer display cover;
attaching fasteners to tabs of the brackets to affix the brackets to the outer display cover; and
mounting an antenna in a peripheral space between an edge of the outer display cover and an outer edge of the display panel.

17. The method of claim 16, further comprising:
following the attaching of the display panel to the brackets and prior to the mounting of the removed assembly into the outer display cover, adjusting, using a driver, a position of the display panel relative to the brackets.

18. The method of claim 16, comprising:
attaching the fasteners into through-holes of tabs of the brackets; and
affixing the fasteners to receptacles of the outer display cover.

19. The method of claim 16, further comprising:
mounting a camera in the peripheral space.

* * * * *